United States Patent [19]

Mazzucchelli

[11] Patent Number: 4,646,452

[45] Date of Patent: Mar. 3, 1987

[54] MARK APPLICABLE TO GENERAL ARTICLES WITH BLOCKING DEVICE AGAINST ABUSIVE REMOVAL

[75] Inventor: Arnaldo Mazzucchelli, Grumello del Monte, Italy

[73] Assignee: Plasti-Max S.r.l., Bergamo, Italy

[21] Appl. No.: 668,966

[22] Filed: Nov. 7, 1984

[30] Foreign Application Priority Data

Nov. 21, 1983 [IT] Italy ............... 23605/83[U]

[51] Int. Cl.⁴ ............................................. A44C 3/00
[52] U.S. Cl. ...................................... 40/2 R; 40/2 E; 40/11 R; 40/625; 40/10 R; 24/522; 211/74
[58] Field of Search .............. 128/207.17; 248/49, 248/231.4, 236, 316.4; 211/74; 24/265 H, 522, 490; 40/618, 316, 317, 11 R, 625, 10 R, 2 R, 2 E; 339/255 R, 255 A, 66 M, 49 R, 29 R, 28, 95 R

[56] References Cited

U.S. PATENT DOCUMENTS

| | | | |
|---|---|---|---|
| 1,112,679 | 10/1914 | Craig | 24/522 |
| 1,417,325 | 5/1922 | Hopp et al. | 40/11 R |
| 1,449,965 | 3/1923 | Zepka | 40/625 |
| 1,728,789 | 9/1929 | Devins | 40/10 R |
| 2,455,236 | 11/1948 | Darvie et al. | 24/522 |
| 2,811,703 | 10/1957 | Becker | 339/255 R |
| 2,835,538 | 5/1958 | Kornely | 24/522 |
| 2,862,435 | 12/1958 | Buchenberger et al. | 248/231.4 |
| 2,999,291 | 9/1961 | Imparato | 24/490 |
| 3,120,308 | 2/1964 | Pierro | 24/265 H |
| 3,147,754 | 9/1964 | Koessler | 128/325 |
| 3,602,227 | 8/1971 | Andrew | 248/49 |
| 3,760,811 | 9/1973 | Andrew | 128/207.17 |
| 3,861,771 | 1/1975 | Cornell | 339/95 R |
| 3,939,986 | 2/1976 | Pierro | 211/74 |
| 4,373,766 | 2/1983 | Johnston | 339/176 M |
| 4,390,233 | 6/1983 | Sanders, Jr. | 339/255 R |
| 4,468,841 | 9/1984 | Herington | 24/67 R |

FOREIGN PATENT DOCUMENTS

| | | | |
|---|---|---|---|
| 326378 | 6/1936 | Italy | 24/522 |
| 431131 | 9/1933 | United Kingdom | 24/522 |

Primary Examiner—Gene Mancene
Assistant Examiner—J. Hakomaki
Attorney, Agent, or Firm—Oblon, Fisher, Spivak, McClelland & Maier

[57] ABSTRACT

A first and a second element, the latter being insertable in the former, but prevented from being extracted due to operation of blocking means. Each of the said first and second elements is provided with cooperating members for engaging the article to be marked. The blocking means can be disengaged.

8 Claims, 8 Drawing Figures

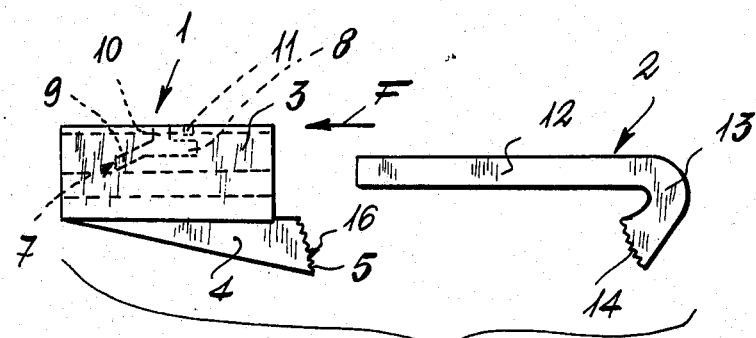
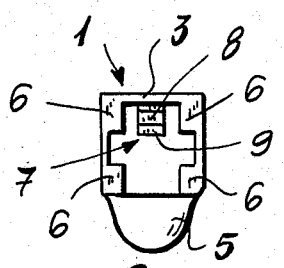
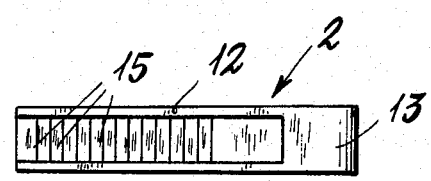
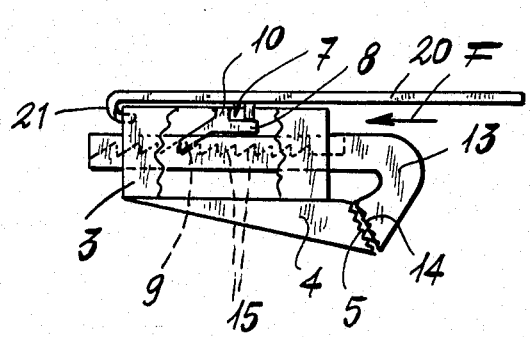
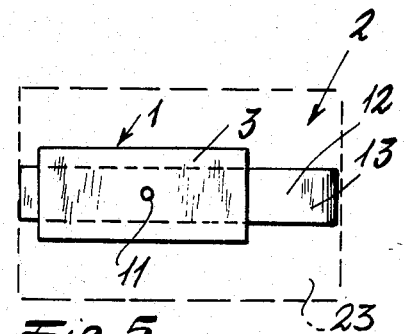
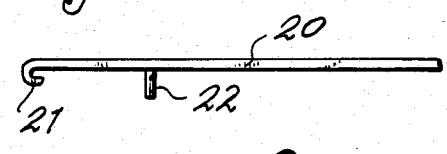

MARK APPLICABLE TO GENERAL ARTICLES WITH BLOCKING DEVICE AGAINST ABUSIVE REMOVAL

FIELD OF THE INVENTION

The invention relates to a mark for application to general articles with blocking device against abusive removal.

BACKGROUND OF THE INVENTION

It is a common practice in large department-stores to arrange the articles on benches freely accesible to the public. This enables a purchaser to check the quality, to search for the desired size, and to effect all of those other operations generally assigned to a salesman. At the end of selection, the article is handed over to a cashier for payment.

Such a sale system is undoubtedly practical or convenient. However, it suffers from the disadvantage of enabling malicious people to take advantage of free access to the benches to steal merchandise—for example, by stealthily putting on garments that of course will not be reported to the cashier.

The conventional marks, generally comprising labels attached to the articles by means of cord or string or sewn onto the articles are readily removable. Accordingly, the absence thereof on the article does not assure at all the payment therefor.

OBJECTS OF THE INVENTION

It is the principal object of the present invention to provide a mark of such a shape that it cannot be removed except by an authorized person, such as a cashier's assistant in the case of large department-stores.

This and further objects of the invention will become apparent to those skilled in the art from the reading of the following description and claims.

SUMMARY OF THE INVENTION

According to the invention, a mark is essentially characterized by comprising a first and a second element, the latter being insertable in the former, but prevented from being extracted due to operation of blocking means. Each of the first and second elements is provided with intercooperating members to engage the article to be marked and with means for disengaging the blocking means.

BRIEF DESCRIPTION OF THE DRAWINGS

By way of example, two embodiments of the invention are shown in the accompanying drawings.

FIG. 1 is a side view of the mark with disassembled elements.

FIG. 2 is a view in the direction of arrow F of FIG. 1 of only the first element.

FIG. 3 is a top view of only the second element.

FIG. 4 is a side view of the mark with assembled elements, the first element being partially broken away to show the blocking device.

FIG. 5 is a top view of the assembled mark.

FIG. 6 is a side view of the release key.

DETAILED DESCRIPTION OF THE PRESENTLY PREFERRED EMBODIMENTS

Figure 7:
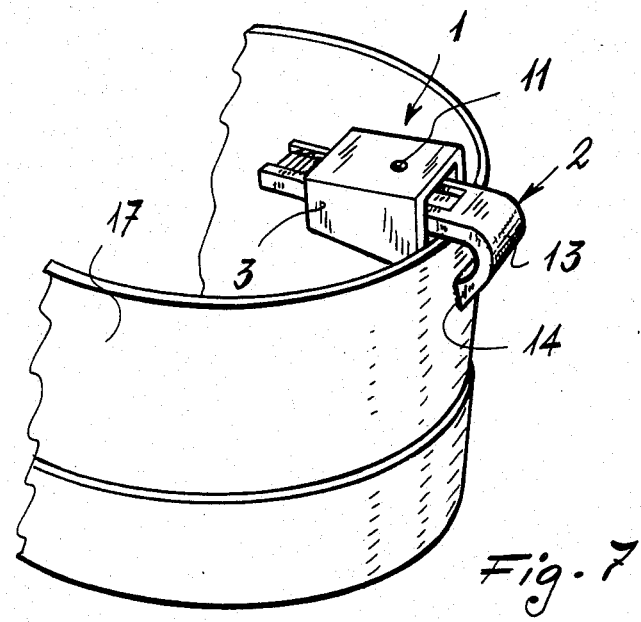
FIG. 7 is a view showing the mark mounted on a shoe.

Referring to the drawings, a first embodiment of a mark according to the invention comprises a first and a second element of suitable moldable rigid material, conveniently plastics, generally denoted at 1 and 2.

The element 1 comprises a parallelopipedal body 3 provided at the bottom in an extension 4 terminating with a plane 5. As particularly shown in FIG. 2, the body 3 is internally hollow and is longitudinally provided with profiles 6 defining guides for sliding of the second element 2, as further described in the following. From the top wall internally of the body 3 there projects a blocking member, generally denoted at 7. The blocking member 7 comprises a first tongue 8 and a second tooth tongue 9. The two tongues 8 and 9 from a unitary the body connected to body 3 by an extension 10.

On the outer face of the body 3 adjacent the tongue 8 a through hole 11 is provided. The function of the through hole 11 will be described in the following.

The element 2 comprises a rectilinear bar 12 terminating in a bent portion 13 terminating in a plane 14 substantially corresponding to the plane 5 on element 1. A plurality of teeth 15 transversely extending are provided on the upper side of the bar 12. The bar 12 is dimensioned for sliding along the guides defined by the profiles 6 in the element 1.

As particularly shown in FIG. 4, in operation the element 2 is inserted in the element 1 in the direction of arrow F to bring the planes 5 and 14 into propinquity to clamp there between the article to be marked—such as, for example, a foulard, gloves, chemises, and similar garments.

During sliding, the second tongue 9 bears on the teeth 15, allowing the introduction of the element 2, but preventing the removal thereof by crawling of the second tongue 9 against the teeth 15. That is, the teeth 15 function as a ratchet, and the second tongue 9 functions as a pawl.

The planes 5 and 14 have suitably knurled surfaces for gripping a textile article between them. Alternatively, for marking shoes, one of the planes could have a small projecting tip 16 (FIG. 1) suitable to pinch the inner skin or leather of a shoe 17 with a mark mounted as shown in FIG. 7.

Figure 8:
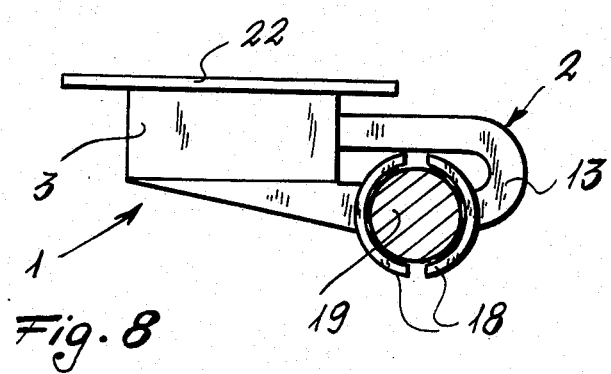
FIG. 8 shows a modified mark for application on articles other than garments.

In the modified embodiment shown in FIG. 8, semi-circle members 18 may be associated with the planes 5 and 14 for embracing a rigid portion 19 of an article—such as, for example, an umbrella, a suit-case handle, bag articles, and the like.

For mark release, to be effected by an authorized person, use must be made of a key 20 shown in FIGS. 4 and 6. The key 20 has one end 21 intended to engage an edge of the body 3 (FIG. 4) and a pin 22 for penetration into the through hole 11. Insertion of the pin 22 into the through hole 11 urges the first tongue 8 of the blocking member 7 downwardly. This is turn causes the lifting of the second tongue 9 and disengagement thereof from the teeth 15 of the element 2. This permits the element 2 to be unslipped from the element 1, thus releasing the article.

In order to hide the through hole 11, the mark is conveniently provided with a plate 23, shown by dashed lines in FIG. 5, snap mounted on the element 1 and carrying all the required data for the article.

From the foregoing it clearly appears that a mark according to the invention can be readily applied to the articles, but cannot be removed therefrom without the use of the proper key or other similar means. The dimensions of the mark with the plate 23 are sufficiently large to be always in view with the article worn on, or however in view when applied to articles other than garments. This discourages malicious people.

It is evident that the shape and dimensions of the gripping members (i.e., the planes 5 and 14 and the semicircle members 18) could vary depending on the type of article to which the mark is to be mounted.

What is claimed is:

1. A mark adapted to be attached to an article for sale, said mark comprising:
   (a) a first element containing a bore and
   (b) a second element sized and shaped to be inserted into said bore;
   (c) said first element comprising a pawl mounted on an inner wall of said bore and projecting into said bore;
   (d) said second element comprising a ratchet on one surface positioned to engage said pawl when said second element is inserted into said first element to prevent removal of said second element from said first element;
   (e) said first element comprising a first gripping member;
   (f) said second element comprising a second gripping member sized, shaped, and positioned to cooperate with said first gripping member to clamp an article for sale between said first and second gripping members when said first element is inserted into said second element;
   (g) releasing means for pivoting said pawl out of engagement with said ratchet to permit removal of said second element from said first element, said releasing means comprising a tongue mounted on an inner wall of said bore and projecting from said pawl and a through hole extending from the exterior of said first element to said bore in position to permit a tool to be inserted through said hole to contact said tongue; and
   (h) means for concealing the exterior opening of said through hole.

2. A mark as recited in claim 1 wherein said bore extends through said first element.

3. A mark as recited in claim 1 wherein said first and second gripping members comprise mating knurled surfaces.

4. A mark as recited in claim 1 wherein said first and second gripping members comprise mating semicircular members.

5. A mark as recited in claim 1 wherein said first and second gripping members comprise a sharp tip sized, shaped, and positioned to engage the article.

6. A mark as recited in claim 1 wherein said means for concealing the exterior opening of said through hole comprise a plate removably mounted on said first element.

7. A mark as recited in claim 6 wherein said plate is snap fit on said first element.

8. A mark as recited in claim 1 wherein said first element is at least generally parallelopipal in shape.

* * * * *